United States Patent [19]
McGrevy

[11] Patent Number: 5,474,439
[45] Date of Patent: Dec. 12, 1995

[54] FLUID INJECTING NOZZLE HAVING SPACED PROJECTIONS

[75] Inventor: Alan N. McGrevy, Chino, Calif.

[73] Assignee: Caco Pacific Corporation, Covina, Calif.

[21] Appl. No.: 227,003

[22] Filed: Apr. 13, 1994

[51] Int. Cl.⁶ .................................................. B29C 45/20
[52] U.S. Cl. ...................... 425/549; 264/328.15; 425/572
[58] Field of Search ................................. 425/549, 568, 425/572; 264/328.15

[56] References Cited

U.S. PATENT DOCUMENTS 4,386,262  5/1983  Gellert ................................... 425/549
5,324,191  6/1994  Schmidt .................................. 425/572

Primary Examiner—Tim Heitbrink
Attorney, Agent, or Firm—Ellsworth R. Roston; Charles H. Schwartz

[57] ABSTRACT

A nozzle body has a runner, a passage and an orifice, all communicating with one another to provide for fluid flow into and through the body. The fluid is heated during its flow through the nozzle body by an electrical heater on such body and by a heat conductive plug (e.g. copper) extending through the nozzle. A cap made from a heat insulating material (e.g. titanium) and disposed in a tight fit on the nozzle body has a gate well for receiving the fluid in the orifice and for injecting such fluid into a mold. The cap is constructed so that fluid cannot leak into the area around the cap when heated fluid flows through the gate well. The cap is also constructed so that the article formed in the mold from the fluid injected into the article will shear to provide a smooth peripheral surface when the article is ejected from the mold after solidifying. Fluid leakage is prevented by forming a first peripheral portion in the cap around the orifice and by disposing the cap so that the first portion is close to, but separated from, the mold when cold and expands with heat into even closer, but spaced, relationship with the mold. Second portions displaced along the cap periphery from the first portion are contiguous to the mold with the cap cold and abut the mold with the cap hot. Indentations in the cap periphery between the first and second portions insulate the second portions from the first portion.

26 Claims, 1 Drawing Sheet

U.S. Patent      Dec. 12, 1995      5,474,439
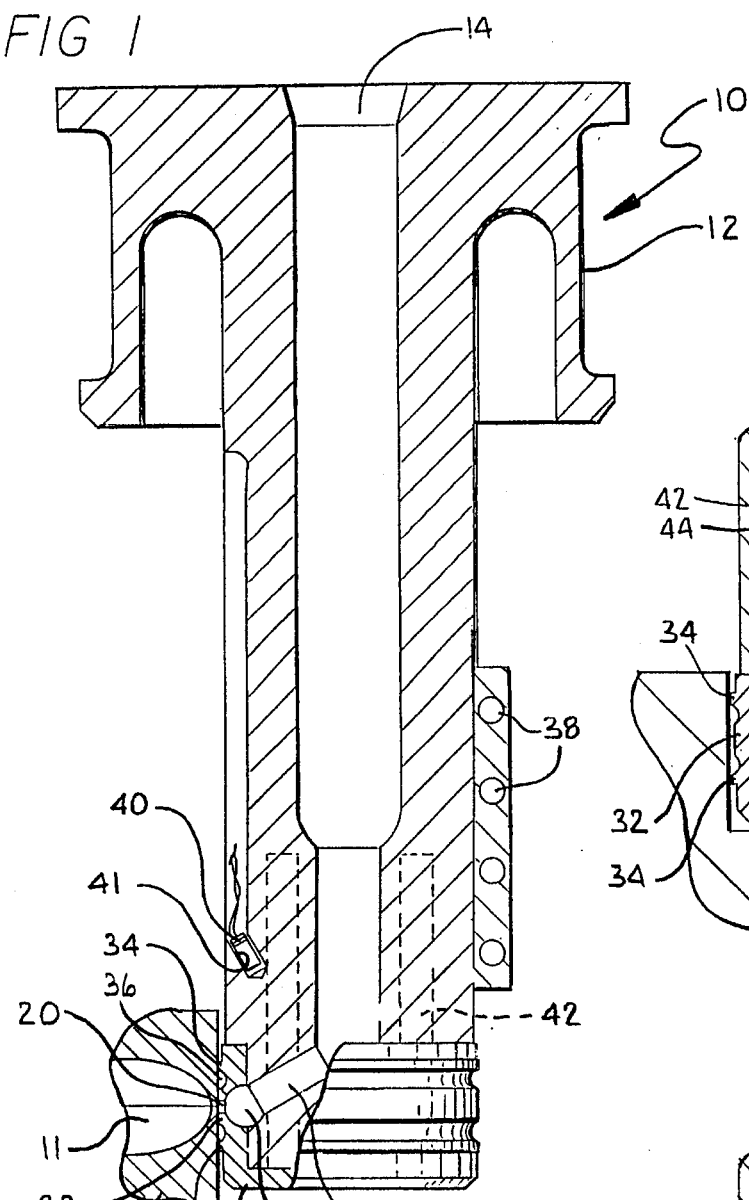
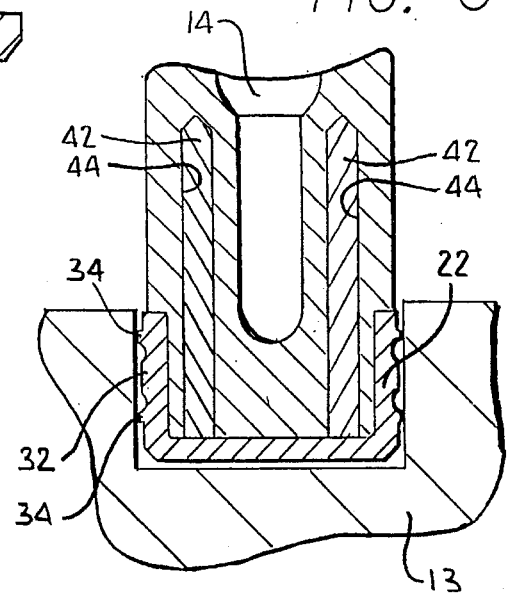
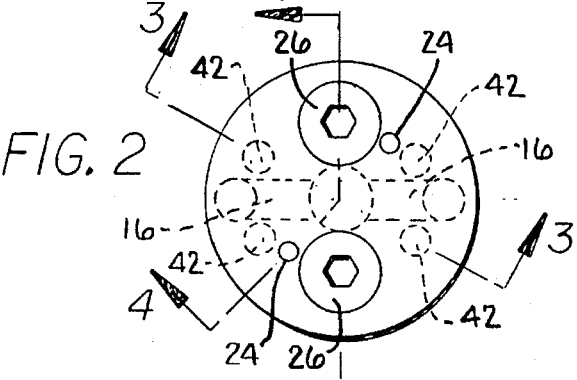
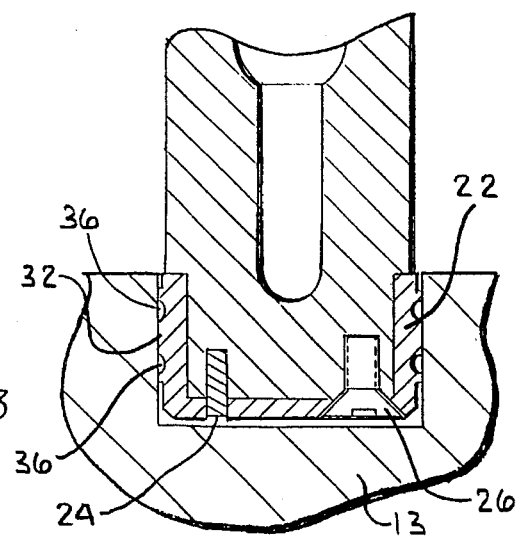

FLUID INJECTING NOZZLE HAVING SPACED PROJECTIONS

This invention relates to apparatus for injecting fluid into molds to form articles corresponding to the cavity in the molds. The invention particularly relates to apparatus for forming articles in molds and for providing for the formation of smooth surfaces on the peripheries of the articles when the articles are sheared after being formed in the molds.

BACKGROUND OF THE INVENTION

Articles are often formed by injecting heated fluid into molds. The fluid is introduced into a runner in a nozzle body. The fluid then flows through passages in the nozzle body and through a gate well into a hollow cavity in the mold. The fluid is heated as it flows through the passages. When the fluid has solidified in the hollow cavity in the mold, it is sheared at the position where the fluid flows through the gate well into the hollow cavities in the molds.

Articles have been formed for decades, if not centuries, by injecting fluid into hollow cavities in molds. In all of this period of time, certain problems have continued to exist in spite of considerable efforts during this period to resolve such problems. For example, at the position where the fluid flows from the gate well in the nozzle body into the hollow cavity in the mold, a scar is formed in the smooth periphery of the article when the article is sheared at the gate well after the article has solidified.

There are other unresolved difficulties in the injection molding of articles. For example, it has been difficult to simultaneously form a plurality of articles satisfactorily from fluid flowing through a plurality of passages in a single nozzle body. It has also been difficult to form articles of a first particular color with a minimal effort in a mold immediately, or even shortly, after articles of a second color have been previously formed in the mold. The fluid remaining in the nozzle body with the second color tends to contaminate the fluid of the first color for an extended period of time after the fluid of the first color has been introduced into the storage body.

This invention provides apparatus which resolves satisfactorily the problems discussed in the previous paragraphs. For example, a single nozzle body is able to inject fluid simultaneously into a plurality of mold cavities to obtain the simultaneous formation of articles in the mold cavities. The single nozzle body also provides for the formation of articles which have a smooth peripheral surface at the positions of the shear when the articles are sheared from the gate well in the nozzle body after they have solidified in the mold. The apparatus of this invention is also advantageous in that an article of a first color can be produced without color contamination by the passage of fluid of that color through the nozzle body shortly after a fluid of a different color has previously passed through the nozzle body.

BRIEF DESCRIPTION OF THE INVENTION

In one embodiment of the invention, a nozzle body has a runner, a passage and a gate well, all communicating with one another, to provide for fluid flow into and through the nozzle body. The fluid is heated during its flow through the nozzle body by disposing an electrical heater on the nozzle body and by extending a heat conductive plug (e.g. copper) through the nozzle.

A cap made from a heat insulating material (e.g. titanium) and disposed in a tight fit on the nozzle body has a gate well for receiving the fluid in the orifice and for injecting such fluid into a mold. The cap is constructed so that fluid cannot leak into the area around the cap when heated fluid flows through the gate well. The cap is also constructed so that the article formed in the mold from the fluid injected into the article will shear to provide a smooth surface at the shear position when the article is ejected from the mold after the fluid has solidified.

Fluid leakage is prevented in the apparatus of this invention by forming a first peripheral portion in the cap around the orifice and by disposing the cap so that the first portion is close to, but separated from, the mold when cold and expands with heat into even closer, but spaced, relationship with the mold. Second portions displaced along the periphery of the cap from the first portion are contiguous to the mold with the cap cold and abut the mold when the cap is hot. Indentations in the cap periphery between the first and second portions insulate the second portions from the first portion.

BRIEF DESCRIPTION OF THE DRAWINGS

In the drawings:

FIG. 1 is a sectional view illustrating one embodiment of apparatus for injecting fluid into a mold cavity;

FIG. 2 is a bottom plan view of the apparatus shown in FIG. 1;

FIG. 3 is a sectional view taken substantially on the line 2—2 of FIG. 2 and shows the disposition of a cap on a nozzle body when the cap is cold around the position of a gate well; and FIG. 4 is a sectional view taken substantially on the line 4—4 of FIG. 2 and shows the disposition of the cap on the nozzle body when the cap has been heated around the periphery of the gate well as a result of the flow of heated fluid through the gate well.

DETAILED DESCRIPTION OF THE INVENTION

Apparatus constituting one embodiment of the invention is generally indicated at 10 for injecting fluid into a cavity 11 of a mold 13. The apparatus 10 includes a nozzle body 12 made from a suitable material such as steel and having a runner 14 for receiving the fluid. The runner 14 communicates with a plurality of passages 16 each displaced angularly from the others. Each of the passages communicates with an individual one of a plurality of orifices 18.

Each of the orifices 18 in turn communicates with a gate well 20 in a cap 22 which may be made from a suitable insulating material such as titanium. The cap 22 may be tightly disposed on the nozzle body 12 as by heating the cap and then disposing the cap on the nozzle body while still hot. The cap 22 is properly disposed on the nozzle body 12 with each gate well 20 in alignment with the adjacent orifice 18. This is accomplished by disposing dowels 24 in sockets in the nozzle body 12 and the cap 22. The cap 22 may be secured to the nozzle body 12 in such aligned relationship by disposing screws 26 in threaded sockets in the nozzle body 12.

The fluid passing through the gate wells 20 are injected into the cavities 11 in the molds 13. Each of the cavities 11 has an opening which is disposed in horizontal alignment with an associated one of the gate wells 20. Each gate well 20 is disposed in a peripheral projection 32 in the cap 22. Each peripheral projection 32 is spaced by a few thousandths of an inch from the associated mold 13 before fluid flows through the gate well into the associated mold cavity. For example, this spacing may be approximately six thousandths of an inch (0.006"). When heated fluid flows through the gate well 20 into the associated mold cavity 11, the cap 22 expands at the position of the projection 32 so that the projection is closer to the associated mold. The separation between the peripheral projection 32 and the associated mold 13 may then be a suitable distance such as approximately four thousandths of an inch (0.004").

A pair of projections 34 are disposed on opposite sides of the projection 32 along the periphery of the cap 22. The projections 34 are contiguous to, but spaced from, the associated mold 13 when the projection 32 is spaced from the associated mold 13. For example, the spacing may be approximately two thousandths of an inch (0.002"). In effect, the projections 34 are so close to the associated mold 13 that they serve as elements for positioning the projection 32 in the desired relationship with respect to the associated mold 13. When the projections 34 become heated, they expand into abutting relationship with the associated mold 13.

The cap 22 is indented as at 36 at positions between the projection 32 and each of the projections 34. The indentations 36 define air gaps for maintaining the projections 34 substantially at ambient temperatures even when heated fluid is flowing through the gate wells 20. In this way, the projections 34 maintain the desired relationship between the projections 32 and the associated mold 13 under all circumstances.

A heater band 38 is supported by the nozzle body 12 to heat the nozzle body. The heating may be regulated by a thermocouple 40 disposed in a socket 41 in the nozzle body 12. Plugs 42 are disposed in sockets 44 in the nozzle body 12. The plugs 42 extend to the passages 16 to heat the fluid flowing through the passages. The plugs may be formed from a suitable heat conducting material such as copper.

Fluid is introduced into the runner 14 in the nozzle body 12. The fluid flows through the passages 16, the orifices 18 and the gate wells 20 into the cavities 11 in the molds 13. The fluid is heated by the heat directed through the plugs 42 as a result of the flow of current through the heater band 38. The heat from the heater unit causes the projections 34 to expand so that they abut against the adjacent molds 13. This prevents fluid from leaking along the periphery of the cap 22 as the fluid flows from the gate wells 20 in the cap into the cavities 11 in the molds 13.

Because of the abutting relationship between the projections 34 and the molds 13 when the article formed in the mold cavities 11 are sheared at the position of the gate wells 20 after solidifying in the mold, the fluid is not able to leak along the periphery of the cap 22. This causes the shearing of the articles at the positions of the gate wells 20 to be clean and the surfaces of the articles to be smooth at the positions of the shear.

The production of smooth surfaces on the articles at the positions of the shear is enhanced by the retention of the projections 34 at substantially ambient temperatures. This is obtained in part because of the cooling action of the air in the air gaps defined by the indentations 36 between the projection 32 and the projections 34. It is also obtained in part because the solidified fluid in the space between the projections 34 in the axial direction along the cap 22 constitutes a heat insulator and confines the fluid only in the area of the gates 20 in the cap. By providing the slight expansion of the projections 34 at the elevated temperatures of the fluid flowing through the gates 20, the projections 34 provide stable platforms for controlling the disposition of the projection 32 relative to the molds 13. This facilitates the clean shearing of the articles at the positions of the gates 20.

The apparatus constituting this invention also has other important advantages. It provides for the simultaneous formation of articles in a plurality of molds. It also facilitates a quick change in the colors in which the articles can be formed in the molds 13. For example, the articles may be initially formed in a red color and then in a blue color. The change from the red color to the blue color can be accomplished in a minimal period of time without even removing the apparatus 10 from its optimal position relative to the molds 13.

The fluid injecting apparatus of this invention also has other important advantages. It provides for a purging of fluid of a first color (e.g. red) in a relatively few cycles of operation after fluid of a second color (e.g.) blue is introduced into the runner 14 in the nozzle body 12. The change in color of the molded articles can be provided without removing any component, including the nozzle 10 or the cap 22, from the apparatus and without performing any work on the apparatus other than to insert the fluid of the second color (e.g. color).

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

I claim:

1. A nozzle for transporting molten material to a cavity in a mold through an opening in the mold, including, a nozzle body, there being a runner in the nozzle body for the introduction of the molten material into the nozzle body, there being an orifice in the nozzle body in communication with the runner in the nozzle body, a heat insulating cap on the nozzle body, the heat insulating cap having a gate well communicating with the orifice in the nozzle body for the flow of the molten material through the orifice and the gate well, the heat insulating cap being constructed to provide a shearing of the article from the mold with a smooth surface at the shearing position after the solidification of the article in the mold, means extending between the nozzle body and the cap for aligning the nozzle body and the cap to provide for the communication between the gate well in the cap and the orifice in the nozzle body, and means for heating the molten material in the passage.

2. A nozzle as set forth in claim 1, including, the heat insulating cap having a body and at least a first peripheral surface extending from the body in a first direction, the orifice extending through the heat insulating cap to the first peripheral surface, the first peripheral surface being disposed at spaced positions in a displaced position from the mold when cold and being expansible to abut the mold after increases in the temperature of the cap as a result of the formation of the article in the mold, the heat insulating cap having a second peripheral surface extending from the body in the first direction and being displaced from the first peripheral surface along the mold in a second direction transverse to the first direction, the second surface being disposed to provide an air gap between the first peripheral surface and the second peripheral surface even after increases in the temperature of the cap as a result of the formation of the article in the mold, the second peripheral surface being disposed closer to the gate well in the cap than the first peripheral surface.

3. A nozzle as set forth in claim 2, including, the first and second peripheral surfaces being disposed in the first direction to provide a spacing between each of the first and second peripheral surfaces and the mold when the molten material in the passage is not being heated.

4. A nozzle as set forth in claim 1, including, the molten material flowing in a particular direction into the opening in the mold through the gate well in the cap, the heat insulating cap having a plurality of peripheral surfaces displaced from one another in a direction transverse to the particular direction to provide for the formation of the article in the mold with an extension only at the position of the gate well and to provide for the breakage of the article from the mold at the position of the gate well with a configuration corresponding to the configuration of the mold.

5. A nozzle as set forth in claim 4, including, means for heating the nozzle body, and a heat conductive member disposed in the nozzle body and extending to the molten material flowing from the runner through the orifice in the nozzle body to heat the molten material as the molten material flows from the runner into the orifice.

6. A nozzle for transporting molten material to a cavity in a mold through an opening in the mold, including, a nozzle body, a runner in the nozzle body, there being a passage in the nozzle body in communication with the runner, there being an orifice in the nozzle body in communication with the passage, means disposed on the nozzle body for introducing heat into the nozzle body, means disposed in the nozzle body for directing to the passage the heat introduced into the nozzle body, and heat insulating means disposed on the nozzle body and including a gate well in communication with the orifice in the nozzle body for passing the molten material from the orifice in the nozzle body to the opening in the mold, the heat insulating means being constructed and disposed relative to the mold for providing a communication of the molten material between the nozzle body and the mold substantially only through the gate well in the heat insulating means and the opening in the mold to provide for a shearing of the article in the mold from the nozzle body, after solidification of the molten material, at substantially only the gate well in the heat insulating means, the heat insulating means being provided with a pair of spaced projections disposed on opposite sides of the opening in the mold and contiguous to, but separated from, the mold when cold and expansible into abutting relationship with the mold when heated.

7. A nozzle as set forth in claim 6, including, the heat insulating means being constructed and disposed relative to the mold in the portion of the heat insulating means between the spaced projections to prevent leakage of the molten material in the area around the gate well in the heat insulating means as the molten material passes from the gate well in the heat insulating means to the opening in the mold.

8. A nozzle as set forth in claim 7, including, means disposed relative to the passage for heating the molten material in the passage, the heating means including a heater and including a heat conductive member disposed in the nozzle body and extending to the passage for transferring heat from the heating means to the passage.

9. A nozzle for transporting molten material to a cavity in a mold through an opening in the mold, including, a nozzle body, a runner in the nozzle body, there being a passage in the nozzle body in communication with the runner, there being in the nozzle body an orifice in communication with the passage, means disposed on the nozzle body for introducing heat into the nozzle body, means disposed in the nozzle body for directing to the passage the heat introduced into the nozzle body, heat insulating means disposed on the nozzle body and including a gate well in communication with the orifice in the nozzle body for passing the fluid from the nozzle body to the gate well in the mold, the heat insulating means being constructed and disposed relative to the mold for providing a communication of the fluid between the nozzle body and the mold of the fluid after solidification substantially only through the gate well in the heat insulating means and the orifice in the mold to provide for a shearing of the article in the mold from the nozzle body at substantially only the gate well in the heat insulating means, and means extending between the heat insulating means and the nozzle body for aligning the nozzle body and the heat insulating means to provide for the communication between the orifice in the nozzle body and the gate well in the cap.

10. A nozzle for transporting molten material to a cavity in a mold through an opening in the mold, including, a nozzle body, a runner in the nozzle body, there being a passage in the nozzle body in communication with the runner, there being in the nozzle body an orifice in communication with the passage, heating means disposed on the nozzle body for introducing heat into the nozzle body, and heat insulating means disposed on the nozzle body and including a gate well in communication with the orifice in the nozzle body for passing the molten material from the nozzle body to the opening in the mold, the heat insulating means having a periphery with a first portion displaced from the mold for preventing the molten material from leaking along the periphery of the heat insulating means during the transfer of the molten material from the orifice in the heat insulating means to the opening in the mold and having second portions disposed on opposite sides of the first portion and separated from the mold when cold and expansible into abutting relationship with the mold when heated.

11. A nozzle as set forth in claim 10, including, the periphery of the heat insulating means also including third portions each disposed between the first portion and an individual one of the second portions along the periphery of the heat insulating means and shaped to heat insulate the heat insulating means from the mold.

12. A nozzle as set forth in claim 10, including, the third portions defining air gaps between the heat insulating means and the mold.

13. A nozzle as set forth in claim 11, including, the first portion being displaced from the mold even when heated and the third portions defining air gaps between the heat insulating means and the mold even when heated.

14. A nozzle as set forth in claim 11, including, the first portion being constructed to be spaced from the mold when the heat insulating means is at ambient temperatures and to become displaced into closer, but spaced, relationship with the mold when the heat insulating means becomes heated.

15. A nozzle as set forth in claim 12, including, the first portion being constructed to be spaced from the mold when the nozzle body is at ambient temperatures and to become displaced into closer, but spaced, relationship with the mold when the injection nozzle becomes heated.

16. A nozzle as set forth in claim 11, including, heat conductive means extending from the heating means to the passage to introduce heat to the molten material flowing through the passage.

17. A nozzle for transporting molten material to a cavity in a mold through an opening in the mold, including, a nozzle body, there being a runner in the nozzle body, means for applying heat to the nozzle body, there being an orifice in the nozzle body in communication with the runner in the nozzle body and in communication with the opening in the mold, a plug extending through the nozzle body to heat the molten material in the runner, the plug being made from a heat conductive material, and a cap made from a heat insulating material, the cap being disposed on the nozzle body at the end opposite the runner and being provided with a gate well in communication with the orifice, the gate well being disposed in the cap to inject into the opening in the mold the molten material flowing through the gate well, the cap being provided with spaced portions contiguous to, but separated from, the mold when cold and expansible into abutting relationship with the mold when heated.

18. A nozzle as set forth in claim 17, including, the plug being made from copper, and the cap being made from titanium, the portion of the cap contiguous to the gate well being disposed in contiguous, but spaced, relationship with the mold when cold and when heated.

19. A nozzle as set forth in claim 17, including, the cap being formed to dispose the cap in contiguous, but spaced, relationship to the mold at the position of the orifice in the cap upon the passage of heated fluid through the gate well and the opening in the orifice and to provide heat insulation between the mold and the cap at positions displaced along the cap from the gate well, the cap being separated from the mold at positions between the orifice and the spaced portions to define heat insulating portions for controlling the heat passing to the spaced portions.

20. A nozzle as set forth in claim 17, including, the cap being formed at positions between the spaced portions, and being disposed relative to the mold at the positions between such spaced portions, to prevent the molten material passing through the gate well into the opening in the mold from leaking along the periphery of the cap past positions on the cap around the gate well and to provide for a shearing of the article in the mold, after hardening of the molten material, only at the position of the gate well.

21. A nozzle as set forth in claim 17, including, the cap being disposed in contiguous, but spaced, relationship to the mold in the vicinity of the opening in the mold when cold and when heated and being indented relative to the mold at positions between the opening in the mold and the spaced portions to provide heat insulation.

22. A nozzle for transporting molten material to a cavity in a mold through an opening in the mold, including, a nozzle body, there being a runner in the nozzle body, means for applying heat to the nozzle body, there being an orifice in the nozzle body in communication with the runner in the nozzle body, a plug extending through the nozzle body to heat the fluid in the runner, the plug being made from a heat conductive material, and a cap made from a heat insulating material, the cap being disposed on the nozzle body at the end opposite the runner and being provided with a gate well in communication with the orifice, the gate well being disposed in the cap to inject into the mold the fluid flowing through the orifice, the cap being formed and being disposed relative to the mold to prevent fluid passing through the gate well from leaking along the periphery of the cap past positions on the cap around the gate well and to provide for a shearing of the article in the mold, after hardening of the molten fluid, only at the position of the gate well, the cap being formed to dispose first portions of the cap around the gate well in contiguous, but spaced, relationship with the mold before the heating of the molten material in the passage and in abutting relationship with the mold after heating of the cap and to provide second portions of the cap with a heat insulating relationship between the cap and the mold, the second portions of the cap being displaced from the mold in a second direction transverse to the first direction.

23. A nozzle as set forth in claim 22, including the cap being formed with third portions further displaced from the gate well than the second portions of the cap, the third portions being displaced from the mold when cold and being expansible into abutting relationship with the mold when heated.

24. A nozzle as set forth in claim 23, including, means associated with the cap and the nozzle body for providing for the disposition of the cap on the nozzle body with the gate well in the cap in alignment with the passage in the nozzle body, and means extending through the cap into the nozzle body for removably holding the cap in fixed relationship to the nozzle body in the aligned relationship between the gate well and the nozzle.

25. A nozzle for transporting molten material to a cavity in a mold through an opening in the mold, including, a nozzle body, there being a runner in the nozzle body, means for applying heat to the nozzle body, there being an orifice in the nozzle body in communication with the runner in the nozzle body, a plug extending through the nozzle body to heat the fluid in the runner, the plug being made from a heat conductive material, a cap made from a heat insulating material, the cap being disposed on the nozzle body at the end opposite the runner and being provided with a gate well in communication with the orifice, the gate well being disposed in the cap to inject into the mold the fluid flowing through the orifice, the cap being formed and being disposed relative to the mold to prevent fluid passing through the gate well from leaking along the periphery of the cap past positions on the cap around the gate well and to provide for a shearing of the article in the mold, after hardening of the molten fluid, only at the position of the gate well, positioning means extending through the cap into the nozzle body for positioning the cap on the nozzle body with the gate well in alignment with the passage, and means extending through the cap into the nozzle body for removably holding the cap in fixed relationship to the nozzle body in alignment between the gate well and the nozzle body.

26. A nozzle as set forth in claim 25, including, the plug being made from copper, and the cap being made from titanium.

* * * * *